United States Patent [19]

Skwirut

[11] 4,090,317
[45] May 23, 1978

[54] CONNECTING LINK FOR FISHING TACKLE

[76] Inventor: Paul T. Skwirut, 2233 Searles Rd., Baltimore, Md. 21222

[21] Appl. No.: 734,417

[22] Filed: Oct. 21, 1976

Related U.S. Application Data

[63] Continuation-in-part of Ser. No. 570,738, Apr. 23, 1975, abandoned.

[51] Int. Cl.² ............................................. A01K 85/00
[52] U.S. Cl. .................................. 43/42.36; 43/42.44
[58] Field of Search ................. 43/42.36, 44.83, 42.08, 43/42.09, 42.44, 44.86

[56] References Cited

U.S. PATENT DOCUMENTS

| 1,546,701 | 7/1925 | Bailer | 43/42.08 |
| 1,548,662 | 8/1925 | Crawford | 43/42.36 |
| 1,727,936 | 9/1929 | Pflueger | 43/42.08 |

FOREIGN PATENT DOCUMENTS

| 1,095,541 | 12/1954 | France | 43/42.36 |

Primary Examiner—Russell R. Kinsey
Assistant Examiner—Robert P. Swiatek
Attorney, Agent, or Firm—J. Wesley Everett

[57] ABSTRACT

The connector link extends between the leader or line of the fishing tackle to the bait which always includes a fish hook whether the bait is artificial or of a natural type. The connector link comprises a metal wire having a straight central section and an open end loop at the front end of the straight central section of the wire for receiving a fishing line, and a loop at the rear end of the straight section for receiving a bait and fish hook, including a holding member of substantially one-half the length of the straight section of the wire which has a central opening extending throughout its length of such size as to be slideable along the wire and over the free open end of the rear loop for holding the open end of the loop in closed position. The outer end of the free end of the forward loop having a latch for engaging the straight section of the wire in front of the holding member when the holding member is positioned adjacent the rear loop to retain the holding element in its rearward position on the straight section of the wire.

5 Claims, 13 Drawing Figures

CONNECTING LINK FOR FISHING TACKLE

This is a continuation -in- part of application Ser. No. 570,738, filed Apr. 23, 1975, and now abandoned.

The present invention relates to a fishing tackle and in particular to a connecting link between the fishing line and the bait and hook, which is easily manipulated to connect the bait and the hook to the line.

The primary object of the invention is to provide a structure that is easy to operate when baiting or changing the bait and hook.

Another object of the invention is to provide a structure that is less inclined to become corroded and demands little or no maintenance care.

A further object of the invention is to provide reinforcing from the forward end of the link to a point nearer to the rear end of the link.

While several objects of the invention have been noted, other objects, uses and advantages will become more apparent as the nature of the invention is more fully disclosed in the following detailed description with reference to the accompanying drawings, of which:

In referring to the drawings, like and similar reference characters are used to designate like and similar parts throughout the several views.

Figure 1:
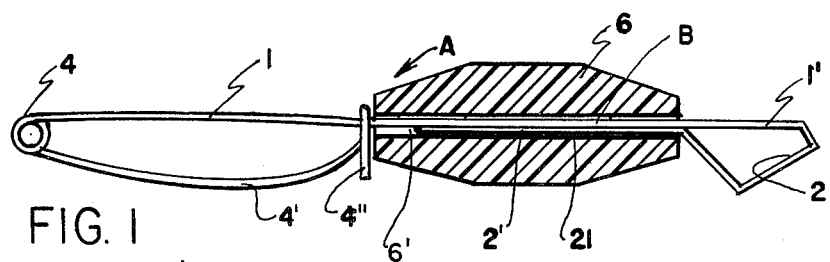
FIG. 1 is a view of the connecting link shown partly in elevation and partly in section.
Figure 2:
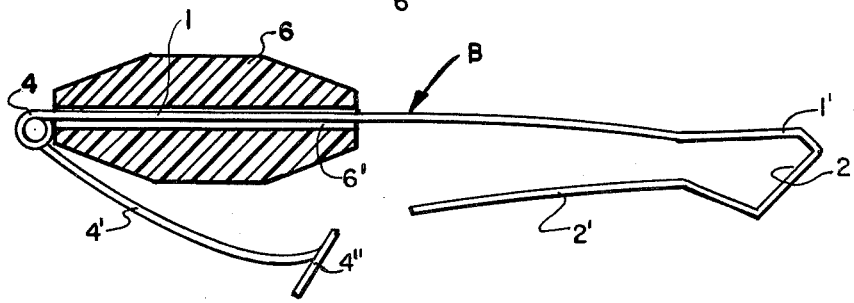
FIG. 2 is a view of the connecting link similar to that shown in FIG. 1 having the parts arranged in a slightly different position.

Referring in particular to FIGS. 1 and 2, the link connector A comprises a wire B having a straight section extending substantially in a straight line from its front end 1 to its rear end 1', and a holding element 6 having an aperture 6' extending longitudinally therethrough.

At the rear end of the straight section 1 of the wire B is an opensided loop 2 having an extended free end portion 2' adapted to lie parallel with the forward portion 1 of the wire B when held in close contact therewith by the slideable holding element 6, as shown in FIG. 1.

At the front end of the straight section 1 is a loop 4 for receiving a fishing line, having an open-side portion 4' of a length substantially one-half the length of the wire B. The outer end of the portion 4' is provided with means in the form of a latch 4" to engage the rear portion of section 1 of the wire B. The member 6 is freely slideable along and about the straight section of the wire B. The holding element 6 is provided with an aperture 6' extending longitudinally throughout its length, the aperture 6' being at least twice the diameter of the wire B. This holding element is slideable along the wire as is well-shown in FIGS. 1 and 2, that is, when the open side 2' of the loop 2 is placed adjacent the straight section of the wire B, the holding element 6 is adapted to be easily slideable over both the wire and the open side 2' of the loop 2.

Figure 3:
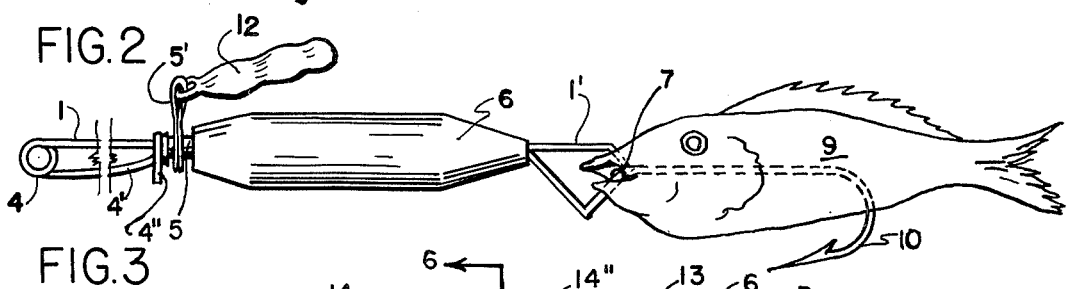
FIG. 3 is a fragmentary view of the connecting link in elevation illustrating the manner in which the bait and hook are attached thereto.

When the holding member 6 is moved to a position adjacent the rear loop 2, the latch 4" is looped about the forward portion of the wire B, as shown in FIG. 1, which keeps the element 6 adjacent the rear loop 2 of the wire B. When it is desired to open the rear loop 2, the latch means 4" on the outer side of the loop 4' is removed from about the wire B and the holding member 6 is then moved forward as shown in FIG. 2, releasing the free side 2' of the loop 2 whereby the bait and/or hook may be removed, or replaced. The connector link A may be provided with an additional artificial bait, as shown in the form of a rotatable spinner 12, as shown in FIG. 3. This artificial spinner is normally carried at the forward end of the holding element 6 but may be attached to the rear end of the holding element, or in fact, it may be carried any place along the holding element. The spinner element 12 is preferably carried on an extension 5, extending outwardly from the forward end of the member 6 and hingedly supported on the member 5'.

The bait 9 and the hook 10 are normally attached to the loop 2, as shown best in FIG. 3. The open side 2' of the loop is passed through a portion of a bait, if the bait is in the form of a minnow, and then through a small opening 7 in the outer end of the stem of a fish hook 10 and further through another portion of the bait (if a minnow), after which the side member 2' is moved up adjacent the straight central section of the wire B, and the holding element 6 is moved rearwardly of the link to encompass the open side 2' of the loop locked in place by the latch 4".

Figure 4:
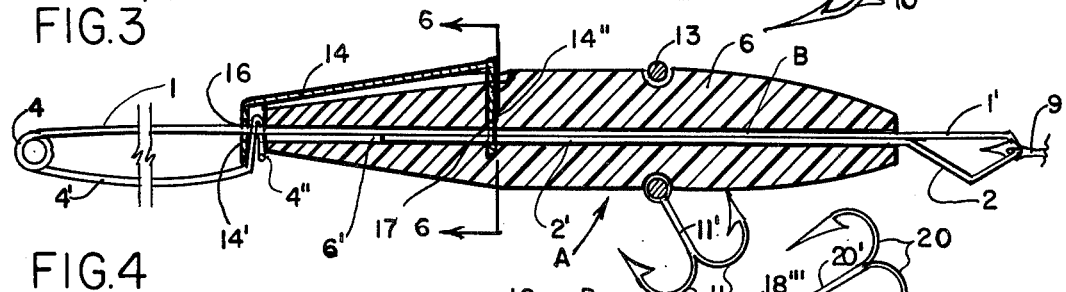
FIG. 4 is a fragmentary view of the connecting link partly in elevation and partly in section similar to that shown in FIG. 1, including means for reinforcing the link.

The holding element 6 may be provided with an auxiliary fish hook 11 having an elongated stem 11' which in turn is provided with an eye at the outer end thereof wherein the eye is held to the holding element 6 by a ring member 13 adapted to engage the holding element, as shown in FIG. 4.

The link element A may also be reinforced by a metal strip 14 as shown in FIG. 4 having the forward end 14' formed at right angles to the wire B and having an opening 16 adapted to slide along the wire B and is positioned in front of the latch 4" in order that the forward pull on the link will be against the metal strip. The strip extends rearwardly along the outer surface of the holding element 6 and the opposite end of the reinforcing member 14 is also provided with a second angled portion 14" having aperture 17 formed in the end of the angled portion 14" to allow the wire B and the end 2' of the rear loop 2 to extend through the rear aperture 17.

Figure 5:
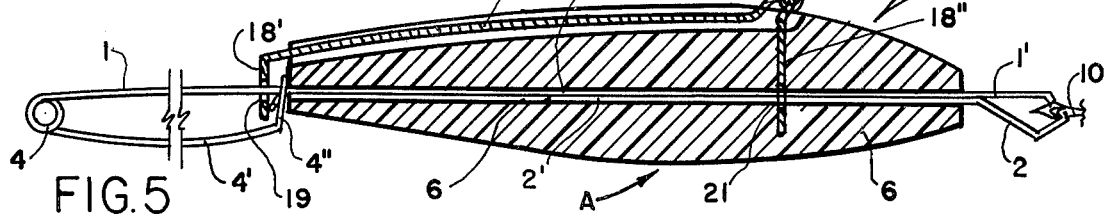
FIG. 5 is a fragmentary view of the connecting link partly in elevation and partly in section similar to that shown in FIG. 4, illustrating a modified form of link reinforcing means.
Figure 6:
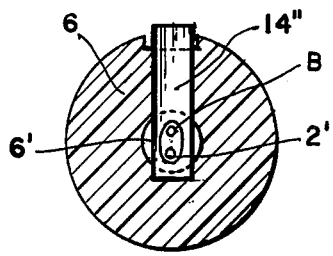
FIG. 6 is a sectional view taken on line 6—6 of FIG. 4.

Referring now in particular to FIG. 5, the reinforcing member 18 is shown in slightly modified form to that of the reinforcing element 14, previously described. The member 18 differs from the member 14 in that is it extended to a point adjacent the rear end of the holding element 6. The forward end of the member 18 is angled as shown at 18' and is provided with an aperture 19 adapted to slideably receive the wire B. The reinforcing member 18 is further provided with an angled portion 18" and a loop 18'". The loop 18'" is adapted to receive the eye 2' of the fish hook stem 20' of the hook member 20. The reinforcing element 18 is also provided with an aperture 21 to engage the wire B and the side portion 2' of the loop 2 and its function is similar to that previously described for the reinforcing member 14.

Figure 7:
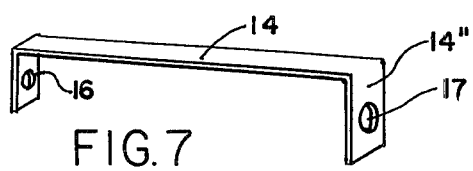
FIG. 7 is a view in perspective of one form of reinforcing means shown in FIG. 4.
Figure 8:
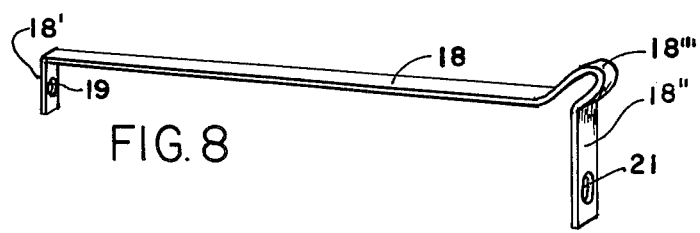
FIG. 8 is a view in perspective of a modified form of reinforcing means shown in FIG. 5.
Figure 9:
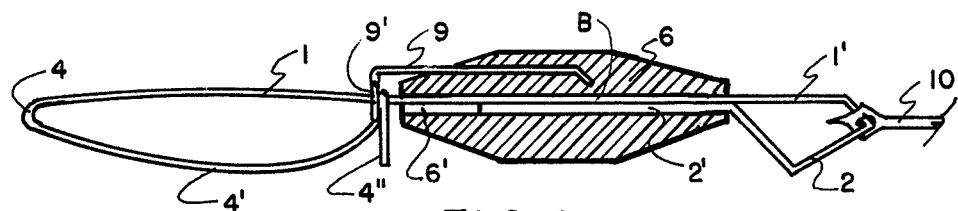
FIG. 9 is a longitudinal sectional view of a modified form of connector link.
Figure 10:
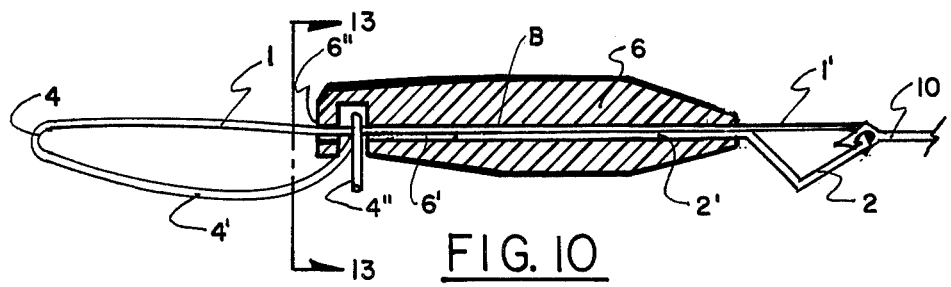
FIG. 10 is a further longitudinal sectional view of another modified form of connector link.
Figure 11:
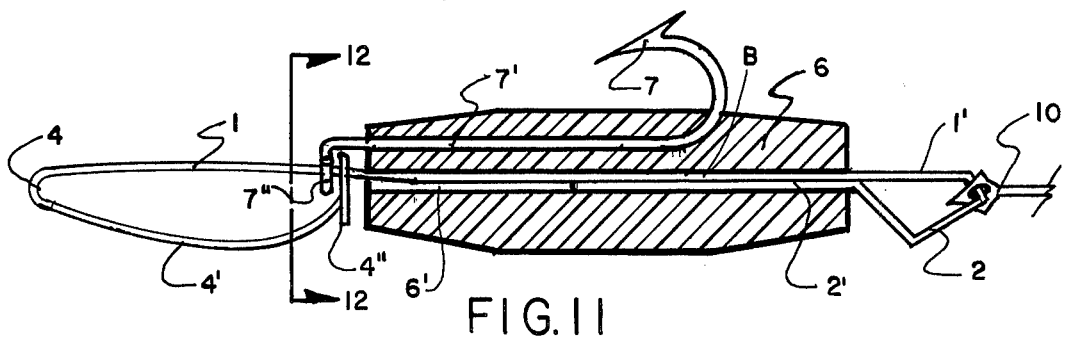
FIG. 11 is still another longitudinal sectional view of another modified form of connector link.
Figure 12:
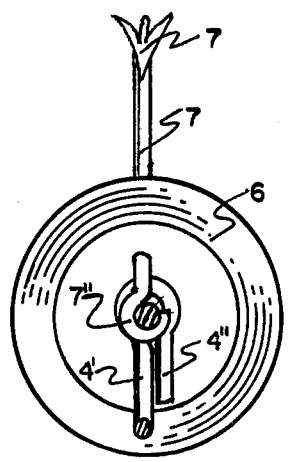
FIG. 12 is a sectional view taken on line 12—12 of FIG. 11.
Figure 13:
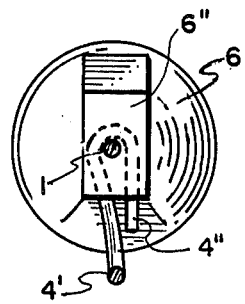
FIG. 13 is a sectional view taken on line 13—13 of FIG. 10.

FIGS. 9 to 13 relate to several modified forms of the connector link. These modifications are for the purpose of relieving pressure against the rear loop 2 at the rear of the holding element 6 for which there is provided a stop 9, as shown in FIG. 9, fixed to the holding element 6. As shown in FIG. 10, the stop 6" is a part of the holding element itself. This stop is adapted to extend over and about the straight forward section 1 of the wire B ahead of the latch element 4" positioned at the forward end of the connecting link when the latch 4" engages the straight section 1 of the wire B, as shown at 9' in FIG. 9, and at 6" in FIG. 10, and 7" in FIG. 11. When strain is placed on the connector link, such as that present in the catching of a fish on the hook 10, and a pull on the line (not shown) connected with the forward loop 4, the latch will move into contact with the rear side of the respective stop and take the excess strain off the rear loop 2 thereby preventing the rear loop 2 from collapsing. FIG. 9 shows the holding element 6 provided with the stop element 9 fixed to the holding element 6 and its forward end 9' extending outwardly and over the straight section 1 of the wire B and in front of the latch member 4". The member 9 is provided with an aperture in the forward end through which section 1 of the said wire B will easily slide. In FIG. 10 the holding element 6 is provided with an extended portion 6" of the holding element 6. The portion 6" is also provided with an aperture through which the straight section 1 of the wire B will easily slide as described for FIG. 9. In FIG. 11 the holding element is provided with a hook 7 rigidly secured to the holding element 6. The outer end of the hook shank is formed at substantially a right angle having a loop 7", as shown best in FIG. 12, through which the straight section 1 of the wire B will freely slide.

A connecting link of this construction allows for easy manipulation in baiting or changing baits and hooks and provides for less chance of becoming fouled with corrosion which frequently occurs with devices of this type. The stop elements shown in FIGS. 4 to 11 are also of great advantage in taking the strain off the rear loop 2 particularly in cases where exceptional pull is exerted on the line.

While the connecting link is shown in detail in specific form, it is not intended as a limitation as the scope of the invention is best defined in the appended claims.

I claim:

1. A connector link for fishing tackle comprising an elongated single wire having a substantially straight central section and an open-side end loop of substantial size having a straight outer end portion formed on the rear end of the wire for receiving a bait and/or fish hook, the straight outer end portion of the open side of the rear loop adapted to extend substantially parallel adjacent the straight central section of the wire for a substantial distance and an opensided end loop at the forward end of the wire for receiving a fishing line, the outer end of the open side of the forward end loop having means for engaging the straight section of the wire, a holding element of substantially one-half the length of the straight section of the wire having a single aperture extending substantially along the longitudinal axis thereof and receiving the straight section of the wire and the free parallel portion of the end of the rear loop, the means on the outer free end of the forward loop for engaging the straight section of the wire being of such length as to engage the straight section of the wire in front of the holding element when the holding element is in its rearward position, an elongated reenforcing element extending over at least the forward end of the holding element having a forward angled section, a substantially straight center section and an angled rear section, said angled sections being formed at right angles to the straight section of the wire including apertures extending through each of the ends of the angled sections of such size as to slideably receive the said wire, the front angled end of the reenforcing member adapted to slideably engage the straight section of wire in front of the wire engaging means formed on the forward end of the said wire, the reenforcing element extending rearwardly along the outer surface of the holding element to a predetermined point, said holding element having an opening formed perpendicular to the central aperture of such size as to admit the rear angled portion of the reenforcing member, said rear angled portion extending through said opening to a point where the opening therein engages the straight section of the wire extending through the elongated central aperture of the holding element.

2. A connector link for fishing tackle comprising, an elongated single wire having a substantially straight central section and an opensided rear end loop of substantial size having a straight outer end portion formed on the outer end of the wire for receiving a bait and/or fish hook, the straight outer end portion of the open side of the rear loop being adapted to extend substantially parallel and adjacent to the straight central section of the wire for a substantial distance, and an opensided end loop at the forward end of the wire of a length at least as great as the length of the parallel portion of the open side of the rear wire loop for receiving a fishing line, the outer end of the open side of the forward end loop being doubled back on itself and having a latch means for engaging the straight section of the wire, a holding element of at least substantially one-half the length of the straight wire section having a single aperture extending substantially along the longitudinal axis thereof for receiving the straight section of the wire and the free parallel portion of the end of the rear loop a stop element carried by the holding element, the latch means carried by the forward loop being so positioned thereon as to engage the straight section of the wire in rear of said stop element when the holding element is in its rearward position.

3. In a connector link for fishing tackle as claimed in claim 2 wherein the stop element is formed from the forward end portion of the holding element, said stop element being spaced outwardly and extended over the forward end of the main body portion of the holding element, said extended portion having an aperture therethrough in line with the aperture passing through the axis of the main body portion of the holding element to slideably receive the forward end of the straight section of the wire, the space between the main body portion of the holding element and the extended portion being of such a distance as to receive the said latch means between the main body portion and the extended portion when the holding element is in its rear position.

4. In a connector link for fishing tackle as claimed in claim 2 wherein the main body portion of the holding element is provided with a separate stop element fixed to the holding element and having its forward end extending forward of the holding element and spaced outwardly therefrom at a distance to receive the wire latching means in rear of the said stop when the holding element is in its rearward position.

5. In a connector link for a fishing tackle as claimed in claim 2 wherein the stop element is in the form of an extended fish hook shank, said shank extending outwardly in front of the holding element and bent substantially at right angles to the remainder of the said shank and having means in said bent portion for admitting the wire extending through the holding element, the latch means formed on the forward end of the wire being adapted to engage itself in rear of the said bent portion of the hook.

* * * * *

UNITED STATES PATENT OFFICE
CERTIFICATE OF CORRECTION

Patent No. 4,090,317  Dated May 23, 1978

Inventor(s) PAUL T. SKWIRUT

It is certified that error appears in the above-identified patent and that said Letters Patent are hereby corrected as shown below:

Column 3, line 11 - after "eye" delete "2'"

Signed and Sealed this

Nineteenth Day of September 1978

[SEAL]

Attest:

RUTH C. MASON
Attesting Officer

DONALD W. BANNER
Commissioner of Patents and Trademarks